Nov. 9, 1948.  S. FREED  2,453,426
WHEEL TRACTION DEVICE
Filed May 10, 1946
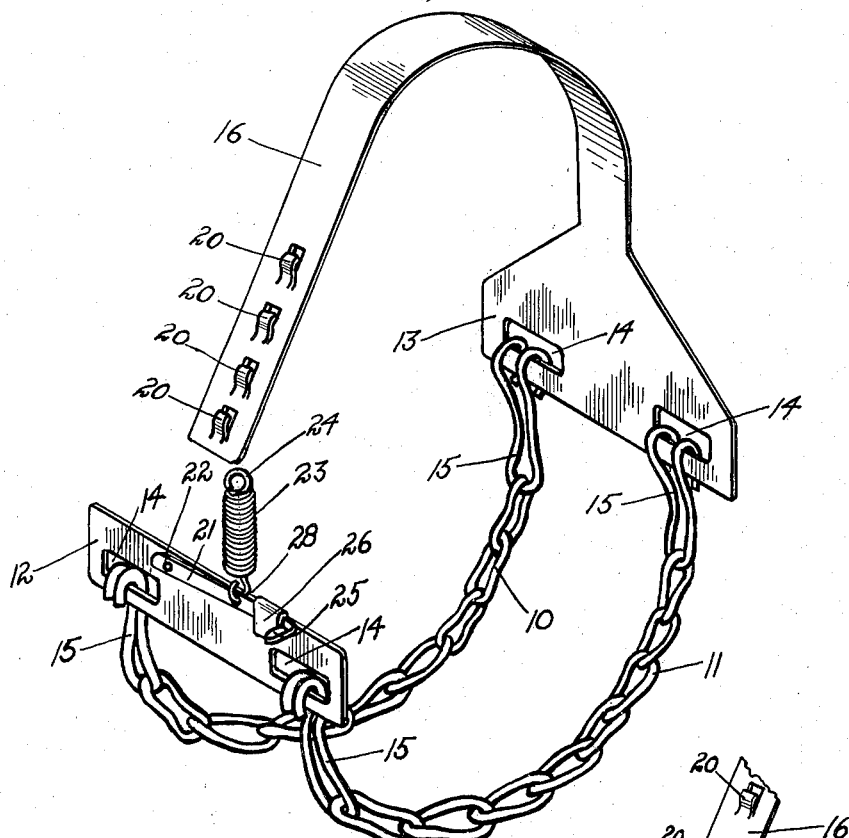
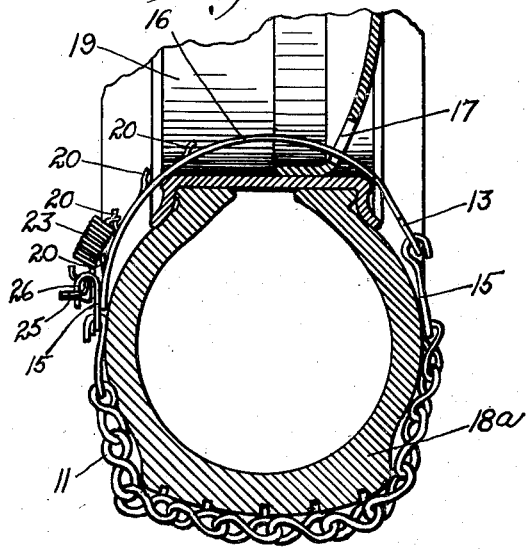
INVENTOR.
Samuel Freed
BY
Johnson, Kline and Hensel
ATTORNEYS Patented Nov. 9, 1948

2,453,426

UNITED STATES PATENT OFFICE 2,453,426

WHEEL TRACTION DEVICE

Samuel Freed, Danbury, Conn.

Application May 10, 1946, Serial No. 668,787

4 Claims. (Cl. 152—237)

1

This invention relates to tire traction devices, and more particularly to an emergency chain or traction device such as a mud-hook for application to an automobile tire and wheel.

An object of the invention is to provide an improved emergency traction device which may be quickly and conveniently secured to the wheel and tire of a car when the need arises, will be securely retained in place during use, and may be quickly and easily removed from the wheel after the need for the device has passed.

Another object of the invention is to provide an emergency traction device as above which is extremely simple in construction and economical to manufacture, and which is efficient and reliable in use.

A feature of the invention is the provision of a traction device as above which is universal in use, being applicable to all current types of automobile wheels and tires.

Other features and advantages will hereinafter appear.

In the accompanying drawings:

Figure 1 is a perspective view of the emergency traction device of the invention.

Fig. 2 is a fragmentary perspective showing the operation of the clamping mechanism, and Fig. 3 is a view of the device attached to an automobile wheel and tire, which latter are shown in section.

Referring to Fig. 1, showing one specific embodiment of the invention, the improved mudhook or traction device comprises a plurality of cross chains 10 and 11 having their ends joined to tie bars or plates 12 and 13 which latter have for this purpose elongate apertures 14 receiving the end links 15 of the chains. The tie bars 12 and 13 may have any suitable shape or structure. However, in the embodiment illustrated herein, they comprise plates made of heavy sheet metal which may be quickly and economically formed by punching and blanking.

According to the invention a novel connector means is provided for enabling the anti-skid or traction device to be quickly and conveniently secured, and in a reliable manner, to the wheel and tire of a vehicle. This means comprises an extension secured to the tie-plate 13, in the form of a substantially stiff hook-like strap 16 which is so shaped that it can be conveniently passed through an aperture 17, Fig. 3, in a vehicle wheel 18 and extended along the inside wall of the tire 18a and also held in this position which is the most convenient one for attaching the tie-plate 12 to the said strap. The strap 16 is generally

2 rigid with the plate 13 and thus when the traction device is being applied to the automobile wheel, the strap may be easily and quickly passed through the aperture 17 of the wheel and caused to extend across and partially encompass the rim 19 and tire 18a, this being accomplished preferably by holding the tie-plate 13 in one hand while guiding the strap 16 to the proper position as shown in Fig. 3, the other hand being free for clamping the cooperable parts of the device, as described below.

For the purpose of removably attaching the tie-plate 12 to the strap 16 in any of a number of adjusted positions to hold the device to the wheel 18 the said strap is provided with a plurality of fingers 20 which are lanced outwardly therefrom and shaped like hooks. Also, the plate 12 has a lever 21 pivotally secured to it by a pin 22, the lever carrying at a point intermediate its ends an extension spring 23 having a free end 24 shaped in the form of an eye and adapted to be hooked on any one of the fingers 20.

The free end of the lever 21 has a laterally extending handle portion 25 adapted to be grasped by the fingers, thereby to enable the lever to be conveniently actuated and the tie-plate 12 has means comprising a hooked finger 26 for holding the lever in a predetermined spring-tensioning position when the fastening is made operative, the said position being as shown in Fig. 1.

For enabling the spring 23 to be shifted and conveniently hooked over one of the fingers 20 of the strap during attachment of the device to a vehicle wheel, the pivot pin 22 of the lever 21 is made somewhat loose so that the lever may be swung sidewise away from the tie-plate 12, and moved upwardly past and clearing the locking finger 26, as shown in Fig. 2. This movement of the lever brings the spring 23 in position to enable the end 24 thereof to be easily hooked over an adjacent one of the fingers 20 of the strap 16.

It will be noted that the operation of hooking the spring 23 to a finger 20 of the strap 16 is facilitated not only by the mounting for the spring, comprising the lever 21, but also is greatly aided by the fact that the strap 16 is relatively stiff and hook-like in shape, and can thus be easily maintained in proper hooking position when the tie-plate 13 is being held in the one hand during installation of the device, and this is an important feature of the invention.

This is in sharp contrast with prior devices having straps of canvas, duck, or other relatively flexible material. With such prior devices it was generally necessary for the installer to take a position partially under the car in order to attach the device, whereas by the use of a stiff strap as provided by this invention, such position under the car is not required.

In accordance with the invention, the strap 16, while being relatively stiff, is bendable by hand, being formed of a material such as cold-rolled steel. Thus, the traction device may be furnished with the strap perfectly flat or straight, and the user may put in any bend desired, to fit different-shaped wheels.

After the end 24 of the spring 23 has been hooked over one of the fingers 20 of the strap, the lever 21 is forced downwardly past the locking finger 26, while at the same time the tie-plate 12 is held or urged upwardly toward the hook 16. During this operation the spring 23 is tensioned to a substantial degree, and after the lever 21 has been moved past the hooked finger 26, it is released, whereupon it snaps under the said finger and is locked thereby in the position shown in Fig. 1.

The traction device will then be securely held in place on the wheel 18 of the vehicle so that the cross chains 10 and 11 extend around and embrace the tire 18a thereof. The spring 23, being under tension, will tightly hold the device in place and prevent any considerable shifting during its use, and will also prevent looseness which would result in slapping the fender of the vehicle and causing considerable undesired noise.

When the lever 21 is in the locked position shown in Fig. 1, clearance is provided for the end of the spring 23 which is attached to the lever, by a notch 28 in the tie-plate 12, Fig. 2.

At such time that the device is to be removed, this may be quickly and conveniently accomplished by merely unhooking the lever 21 from the finger 26, and then subsequently unhooking the end 24 of the spring from the finger 20 which has been carrying it.

It will be appreciated that the traction device of this invention is extremely simple and rugged in construction, and, by virtue of the device being continually under spring tension, is securely held to the wheel and tire against any looseness or any tendency to slip out of place. Also, by virtue of the strap 16 being made in the form of a hook rigid with the tie-plate 13, the installation of the device on a wheel is greatly facilitated, since the strap may be located and maintained in proper position for fastening to the spring 23 by the use of but a single hand, and from the outside of the wheel 18.

While the strap 16 has been shown as curved, it should be understood that it may have any other shape which in general conforms to the contour of a hook, and still have utility for the purpose specified.

Variations and modifications may be made within the scope of this invention and portions of the improvements may be used without others.

I claim:

1. An emergency traction device for an automobile wheel, comprising a plurality of road-engaging elements located side by side; a pair of tie bars secured to the ends of the said elements, one of the said tie bars having secured thereto and extending therefrom a relatively stiff, hook-like strap shaped to pass through an aperture in the automobile wheel and extend across and partially encompass the rim of the wheel; and cooperable fastening means on the other of the said tie bars and on the said strap, including resilient means extending between the end of the strap and the said other tie bar yieldably drawing said device about the rim of the wheel.

2. An emergency traction device for an automobile wheel, comprising a road-engaging element; a pair of connectors secured respectively to opposite ends of the said element, one of the connectors including an extension shaped to pass through an aperture in the automobile wheel and extend across and partially encompass the rim of the wheel; cooperable fastening means on the said extension and on the other of the said connectors, the said fastening means including a tension spring and a lever carrying the said spring, and including hook means engageable by the spring; and means for holding the lever in a predetermined spring-tensioning position when the said fastening means is operative.

3. An emergency traction device for an automobile wheel, comprising a road-engaging element; a pair of connectors secured respectively to opposite ends of the said element, one of the connectors including an extension shaped to pass through an aperture in the automobile wheel and extend across and partially encompass the rim of the wheel; and cooperable fastening means on the said extension and on the other of the said connectors, the said fastening means including projections on the extension, including a tension spring adapted to hook on the projections, and including a lever carrying the said spring and mounted on the said other connector, the latter having means for engaging the lever to hold the same in a predetermined spring-tensioning position.

4. An emergency traction device for an automobile wheel, comprising a road-engaging element; a pair of connectors secured respectively to opposite ends of the said element, one of the connectors including a relatively stiff, hook-like, projecting strap shaped to pass through an aperture in the automobile wheel and extend across and partially encompass the rim of the wheel; and cooperable fastening means on the strap and on the other of the said connectors, the said fastening means including projections on the strap, including an extension coil spring adapted to hook on the projections, and including a lever carrying the spring and mounted on the said connector, the latter having means for engaging the lever to hold the same in a predetermined spring-tensioning position.

SAMUEL FREED.

REFERENCES CITED

The following references are of record in the file of this patent:

UNITED STATES PATENTS

| Number | Name | Date |
|---|---|---|
| 2,239,730 | Moore | Apr. 29, 1941 |
| 2,252,759 | Dodson | Aug. 19, 1941 |
| 2,315,059 | Kane | Mar. 30, 1943 |